(12) United States Patent
Jaasma et al.

(10) Patent No.: US 9,494,074 B2
(45) Date of Patent: Nov. 15, 2016

(54) ARRANGEMENT AND METHOD FOR AN INTERNAL COMBUSTION ENGINE WITH DIRECT DUAL FUEL INJECTION

(71) Applicant: VIALLE ALTERNATIVE FUEL SYSTEMS B.V., Eindhoven (NL)

(72) Inventors: Maria Servatius Alfons Jaasma, Eindhoven (NL); Piet Van Eijck, Westerhove (NL)

(73) Assignee: VIALLE GROUP B.V., Eindhoven (NL)

( * ) Notice: Subject to any disclaimer, the term of this patent is extended or adjusted under 35 U.S.C. 154(b) by 224 days.

(21) Appl. No.: 14/226,163

(22) Filed: Mar. 26, 2014

(65) Prior Publication Data

US 2014/0202420 A1 Jul. 24, 2014

Related U.S. Application Data

(62) Division of application No. 12/920,593, filed as application No. PCT/NL2009/050095 on Mar. 3, 2009, now abandoned.

(30) Foreign Application Priority Data

Mar. 3, 2008 (NL) ..................................... 2001345
Dec. 30, 2008 (NL) ..................................... 2002384

(51) Int. Cl.
*F02B 17/00* (2006.01)
*F02D 19/06* (2006.01)
(Continued)

(52) U.S. Cl.
CPC ......... *F02B 17/005* (2013.01); *F02D 19/0613* (2013.01); *F02D 19/0647* (2013.01);
(Continued)

(58) Field of Classification Search
CPC ............... F02B 17/005; F02D 19/0613; F02D 19/0647; F02D 19/0684; F02D
(Continued)

(56) References Cited

U.S. PATENT DOCUMENTS 5,379,740 A 1/1995 Moore et al.
5,775,282 A 7/1998 Smith
(Continued)

FOREIGN PATENT DOCUMENTS

DE 10042698 A1 3/2002
DE 202005007712 U1 9/2006
(Continued)

OTHER PUBLICATIONS

International Search Report, dated Aug. 7, 2009, from corresponding PCT application.
(Continued)

*Primary Examiner* — Hieu T Vo
*Assistant Examiner* — Carl Staubach
(74) *Attorney, Agent, or Firm* — Knobbe, Martens, Olson & Bear, LLP

(57) ABSTRACT

An arrangement and method for a combustion engine with direct injection and in particular to switching between two types of fuel is disclosed. A high-pressure pump (10) is connected to a combustion engine and the high-pressure rail for the direct injection of a fuel. At least two fuel storages (21,27) containing petrol and liquefied gas are present. The arrangement allows for switching from one fuel to another. Switching occurs by purging a fuel from the high-pressure pump (10) and the fuel supply line connected thereto by temporarily collecting the fuel in a purge unit (28). The purge unit (28) is arranged for purging the high-pressure pump (10), thus forcing out the prevailing fuel and replacing it with the new fuel.

9 Claims, 4 Drawing Sheets

(51) Int. Cl.
*F02D 41/00* (2006.01)
*F02M 37/00* (2006.01)
*F02M 43/00* (2006.01)
*F02M 55/00* (2006.01)

(52) U.S. Cl.
CPC ....... *F02D 19/0684* (2013.01); *F02D 19/0694* (2013.01); *F02D 41/0025* (2013.01); *F02D 41/0032* (2013.01); *F02M 37/0064* (2013.01); *F02M 43/00* (2013.01); *F02M 55/00* (2013.01); *F02D 2250/31* (2013.01); *Y02T 10/36* (2013.01)

(58) Field of Classification Search
CPC .......... 19/0694;F02D 2250/31; F02D 41/0025; F02D 41/0032; F02D 19/0621; F02M 37/0064; F02M 43/00; F02M 55/00; Y02T 10/36
USPC .............. 123/295, 299, 300, 304, 431, 456, 123/575–578; 701/104, 103
See application file for complete search history.

(56) References Cited

U.S. PATENT DOCUMENTS

| | | | |
|---|---|---|---|
| 6,035,837 A | 3/2000 | Cohen et al. | |
| 6,336,598 B1 | 1/2002 | Touchette et al. | |
| 6,491,017 B1* | 12/2002 | Mahr | F02M 41/06 123/299 |
| 6,711,893 B2 | 3/2004 | Ueda et al. | |
| 6,814,057 B2 | 11/2004 | Mahr et al. | |
| 6,923,168 B2 | 8/2005 | Bryde | |
| 8,051,828 B2 | 11/2011 | Sengupta et al. | |
| 8,100,110 B2 | 1/2012 | Shinogle et al. | |
| 8,180,556 B2 | 5/2012 | Cippitani | |
| 8,214,128 B2 | 7/2012 | Watkins et al. | |
| 9,291,109 B2* | 3/2016 | Jaasma | F02D 19/0647 |
| 2002/0139111 A1 | 10/2002 | Ueda et al. | |
| 2003/0183198 A1 | 10/2003 | Mahr et al. | |
| 2005/0217642 A1* | 10/2005 | Glenz | F02D 19/0605 123/459 |
| 2006/0054141 A1* | 3/2006 | Nozaki | F02D 41/042 123/514 |
| 2007/0125338 A1* | 6/2007 | Kato | F02M 21/0254 123/304 |
| 2011/0168132 A1* | 7/2011 | Pursifull | F02M 43/00 123/446 |

FOREIGN PATENT DOCUMENTS

| | | |
|---|---|---|
| EP | 1124048 A1 | 8/2001 |
| JP | 2001-234829 A | 8/2001 |
| JP | 2001-271668 A | 10/2001 |
| JP | 2002-327658 A | 11/2002 |
| JP | 2002-349305 A | 12/2002 |
| JP | 2002-357139 A | 12/2002 |
| JP | 2003-161178 A | 6/2003 |
| JP | 2004-501306 A | 1/2004 |
| JP | 2004-518872 A | 6/2004 |
| JP | 2004-522039 A | 7/2004 |
| RU | 2120052 C1 | 10/1998 |
| SU | 480851 A1 | 8/1975 |
| SU | 1320482 A1 | 6/1987 |
| WO | WO 2007/062217 | 5/2007 |

OTHER PUBLICATIONS

Charles E. Baukal and Robert E E. Schwartz, "The John Zink Combustion Handbook," CRC Press 2001, Print ISBN: 978-0-8493-2337-9, eBook ISBN: 978-1-4200-3869-9, Chapter 5, Table 5.8, p. 164. See "9781420038699.ch5.pdf".

* cited by examiner

ARRANGEMENT AND METHOD FOR AN INTERNAL COMBUSTION ENGINE WITH DIRECT DUAL FUEL INJECTION

RELATED APPLICATIONS

This application is a divisional of U.S. application Ser. No. 12/920,593, filed Sep. 2, 2010 which is the U.S. National Phase of PCT/NL09/50095, filed Mar. 3, 2009, which claims priority to NL 2002384, filed Dec. 30, 2008 and NL 2001345, filed Mar. 3, 2008.

FIELD OF THE INVENTION

The invention relates to an arrangement for the supply of fuel to a combustion engine with direct injection. The invention also relates to a method for such a combustion engine and, in particular, to switching between two fuels.

DESCRIPTION OF THE RELATED ART

It is known that a combustion engine can use two fuels, and in particular a liquefied gas fuel such as LPG and a liquid fuel such as diesel or petrol. The fuels are fed from their respective storage tanks to the combustion engine. In the case of direct fuel injection, the fuel is injected under high pressure directly into the combustion chamber by means of a high-pressure pump mounted onto the engine. A direct injection arrangement as such is advantageous to the consumption of fuel by the engine.

A bi-fuel engine with a high-pressure pump connected to an injector is known from JP 2002327658. Return lines 14-17 of the high-pressure pump feed an excess quantity of fuel back to the respective fuel storage tanks. A problem in such systems is switching between the fuel types, particularly when switching from the gas fuel to the liquid fuel. Separate injection units for the various fuels are expensive. When the high-pressure pump is used for the direct injection of both fuels, an undesirable mixing of the fuels occurs. It is an objective of the invention to provide an arrangement and method wherein two fuels may be used, which can be produced at a low cost and that can operate reliably and, in particular, enable and/or improve switching between the fuels.

At least one of these objectives is achieved with an arrangement according to the invention, comprising at least one high-pressure pump connectable with the internal combustion engine for the direct injection of fuel, wherein the arrangement comprises at least two fuels for a first LPG fuel storage and a second liquid fuel storage. Preferably, at least two fuel lines of the two fuel storages lead to the inlet portion of the high-pressure pump. The fuel lines may be jointly connected. The fuel lines are capable of pumping the respective fuels to the pump. In order to prevent mixing the fuels, the fuel lines are fitted with non-return valves. These valves are preferably mounted in close proximity to the junction of the fuel lines. The valves are preferably mounted upstream of the junction of the fuel lines. The valves are therefore positioned between the junction and the fuel storage means. The junction is arranged further upstream of the pump inlet. According to the invention, the arrangement comprises a purge unit for purging the fuel line connected to the high-pressure pump, preferably the inlet of the pump, and possibly also to the high-pressure pump. The inlet may be the inlet portion of the pump. Due to the presence of the purge unit, the fuel present in the fuel line comlected to the high-pressure pump, in the inlet portion of the high-pressure pump and possibly also in the high-pressure pump itself, can be purged with the selected replacement fuel. This forces the replacement of the prevailing fuel by the new fuel. Switching to a replacement fuel is performed according to a switching procedure. The purge unit can be actuated by the switching procedure and can be active for a limited period of time. The purge unit performs a single purging action. Purging can be accompanied by the accumulation of, for example, the newly selected fuel. The newly selected fuel can be accumulated temporarily. Subsequently, the purging action can be forced to occur and the prevailing fuel can be replaced by the accumulated fuel.

It may be noted that the use of the purge unit is already known from DE 20 2005 007 712, wherein two fuel systems with a high-pressure pump are also shown. However, this is not an LPG fuel system. Residual bio-fuel is purged from the high-pressure pump and injector with petrol, in particular before the engine is started. A fuel pump is used for the purging action. The purging action takes place, for example, when the temperature drops below 20 deg. Celsius. The fuels used have a similar density and pressure.

The purge unit can be arranged in order to equalize the pressure in the fuel line. The purge unit according to the invention is preferably used for purging the LPG fuel from the fuel line and the inlet portion of the high-pressure pump and for the replacement thereof by (the low pressure vapour of) the liquid fuel, such as petrol. It is in fact when this switching procedure is performed that problems occur in prior art arrangements and this is because the pressure of the liquefied gas in the supply line of the high-pressure pump is higher than the pressure in the fuel storage for petrol. The purge unit now enables said switch-over. In one embodiment, the purge unit comprises means for reducing or equalizing said pressure prior to switching over to the new fuel. The pressure reduction means can be connected to a return line, for example. Pressure reduction can be achieved, for example, through a discharge and, more specifically, by means of a return line.

The arrangement may comprise a control unit, connected to the purge unit. The control unit can be arranged for actuating the purge unit when switching from LPG to liquid fuel. The control unit can be arranged for performing and controlling a number of steps required or switching from LPG to liquid fuel. The control unit can be arranged for the timely actuation of the purge unit, in such a manner that this enables and/or improves the switch-over.

The purge unit is preferably filled with a petrol fuel. This enables the liquefied gas to be purged from the fuel line and the high-pressure pump when switching between fuels.

Preferably, the purge unit is fitted to at least one of the fuel lines. The purge unit can be incorporated in the fuel line from the liquefied fuel storage to the high-pressure pump. The purge unit is arranged upstream of the high-pressure pump. Purging can then take place in the direction of the flow of fuel. In one embodiment an excess amount of fuel is supplied. The excess fuel can escape or can be returned to the fuel storage.

In a preferred embodiment of the invention, the purge unit comprises an intensifier for increasing the fuel pressure. The increase is preferably only temporary. The intensifier may be arranged for a single stroke for increasing the pressure. The intensifier may be a displacement means which, for example, comprises two pistons with different diameters and a cylinder with a constriction. Such an intensifier or pressure booster can force accumulated fuel through the constriction by a single stroke. An outlet of the constriction is connected to the fuel line. The compressed fuel can be purged through the fuel line and pump and in this manner preferably displaces the liquefied gas present in the fuel line. Preferably, the inlet or the inlet portion of the pump is also purged.

The purge unit is preferably a hydraulic pressure intensifier. A pressure intensifier as such can be used effectively when switching is performed so that sufficient pressure build-up is achieved at a relatively low cost when switching between fuels.

In one embodiment the intensifier has a discharge with a return line to the fuel storage tank. Said discharge is preferably connected to the inlet side of the displacement means.

A control valve may be present in the return line. Accordingly, it is possible, for example, to bring the piston of one embodiment of the pressure intensifier back to the initial starting position. The available fuel pump can be used for the supply and subsequent discharge of the fuel.

It is particularly advantageous if the fuel line further comprises a non-return valve in the form of a bypass of the displacement means. This bypass is the 'normal' fuel line which, in the operational mode of the engine, essentially feeds the fuel from the storage tank to the high-pressure pump. The purge unit is active during the switch-over mode.

Preferably, the fuel lines of the different fuels merge at a line junction upstream of the high-pressure pump. At least one fuel line, preferably the fuel line of the liquefied gas, includes a return line to the fuel storage tank upstream of said junction. In this manner, the supply of fuel to the combustion engine can be achieved in the usual manner. In particular, it is possible in this manner to control the supply of fuel to the high-pressure pump.

In the case of a low fuel consumption of the engine, the fuel in the fuel line will not be replaced quickly enough.

In a conversion arrangement, in which an existing petrol or diesel fuel engine is converted to a bi-fuel engine, the fuel control unit (ECU) present in the system can be used for controlling the supply of the original fuel, diesel or petrol. An LPE can be applied as a control unit for the LPG fuel in the conversion. In one advantageous embodiment, either an adaptation of the ECU would suffice in the embodiment according to the invention, or an adaptation to an input of the ECU. Experiments have shown that an increased LPG fuel supply of 10 vol. % to 40 vol. % and in particular 15-25 vol. % in relation to the petrol fuel calculated by the ECU results in a desirable, stable operation of the combustion engine. A control as such is exceptionally easy and can be constructed at a very low cost.

To prevent one fuel from contaminating the other fuel, as well as the escape of the liquefied gas fuel, it is proposed, according to the invention, to incorporate a shutter between the connection of the return line and the junction in the fuel line. The shutter ensures a safe shut-off of fuel.

In a particularly advantageous embodiment, the high-pressure pump comprises a return line, more specifically a return line for the liquefied gas fuel. The return line may be connected to the liquid fuel storage means. The purge unit is connected to the return line. In this manner an excess of gas fuel can be fed to the high-pressure pump, specifically by means of a simple control unit as proposed according to the present invention, and the excess amount of gas fuel can be fed back to the gas storage tank.

In one embodiment, the combustion engine comprises a high-pressure rail. The high-pressure rail can be connected with the purge unit. The high-pressure rail can be arranged downstream of the high-pressure pump. The fuel under pressure, which is fed to the combustion chamber, can be fed through the connection to the purge unit where it can then be collected.

In one embodiment, a feed portion of the purge unit is connected to the liquid fuel storage means.

In one embodiment, the purge unit comprises a pressure accumulator. A discharge side of the pressure accumulator can be connected with a suction side of the high-pressure pump, for example, via a control valve. When switching fuels, the accumulated fuel is fed from the pressure accumulator to the suction side of the high-pressure pump and in this manner purges the 'old' fuel, preferably LPG. The pressure can be equalized accordingly, in such to a manner that this simplifies the purging action.

In one embodiment, a supply portion of the pressure accumulator is connected to a discharge portion from the petrol storage. The connection preferably comprises a pump, for example an electric pump. This enables petrol to be supplied to the accumulator for a longer period of time so that it can therefore be accumulated.

The invention also relates to a method for the alternate use of two types of injectable fuel. The method according to the invention achieves at least one of these objectives of the invention by providing a first LPG fuel storage and a second liquid fuel storage, switching between the fuels by alternately feeding the fuels to a high-pressure pump, increasing the pressure of the supplied fuel, and the subsequent injection of the fuel into a combustion engine. Switching from LPG fuel to the liquid fuel preferably comprises purging the fuel supplied to the high-pressure pump. Switching is enabled by purging the fuel supply line of a high-pressure pump (which is required for injecting the fuel). It is possible for the inlet or inlet portion of the pump to be purged.

The purging action according to the invention may comprise the equalization of the pressure of the supplied fuels. Equalizing the pressure simplifies the purging action, thus ensuring the relatively smooth switch-over from the one fuel to the other.

When switching from the one fuel to the other, the purging action preferably comprises at least the temporary accumulation of the other fuel and the subsequent supply and injection of the accumulated fuel. This enables a single stroke of fuel to be collected and released in order to force the fuel present in the line out of the line and inlet portion of the high-pressure pump.

Purging comprises the supply of the liquid fuel under a high pressure, the high pressure being obtained by the stroke of a displacement means. The stroke action is preferably performed by hydraulic means. In one embodiment the fuel is used as a hydraulic medium. This results in a further saving in the arrangement of the purge unit. In addition, an arrangement as such provides greater reliability and safety.

It is furthermore advantageous that switching from one fuel to the other according to the invention comprises the actuation of the other fuel pump, the generation of a preset pressure with the fuel pump, and the displacement of the one fuel after a predefined pressure level is reached. Preferably, the one fuel prevailing downstream of the line is displaced. This forces the switch-over to the other fuel.

It is possible to switch off the one fuel pump after a predefined pressure level is reached. The one fuel pump can continue pumping temporarily after the desired switching moment, in particular during the build-up phase of the purge unit.

When switching from the second fuel to the first fuel, the supply of fuel can be reduced by 10-40% vol. It is advantageous to allow the combustion engine to consume 20-30% vol. more liquefied gas than liquid fuel in similar conditions. This can be applied in a particularly simple adaptation of the ECU.

In one embodiment, purging comprises the evacuation of the supplied fuel via the high-pressure pump. Evacuation ensures the equalization of the pressure. This enables switching to be performed smoothly.

The method preferably also comprises the return feed of liquefied gas from the high-pressure pump for direct injection back into the fuel storage means. This enables an excess amount of liquefied gas to be returned.

According to another aspect of the invention, this further provides an arrangement for a combustion engine with direct injection, comprising at least one high pressure pump connectable with the internal combustion engine for the direct injection of fuel, wherein said arrangement comprises at least two fuel storages for a first fuel and a second fuel, for example liquefied gas and petrol respectively, as well as two fuel lines running from the storage means to an inlet of the high-pressure pump for supplying the fuels to said pump, said lines being provided with non-return valves, wherein a control valve is mounted across a non-return valve in the petrol fuel line.

BRIEF DESCRIPTION OF THE DRAWINGS

The invention will be described below with reference to embodiments illustrated in the drawing, wherein.

DETAILED DESCRIPTION

Figure 1:
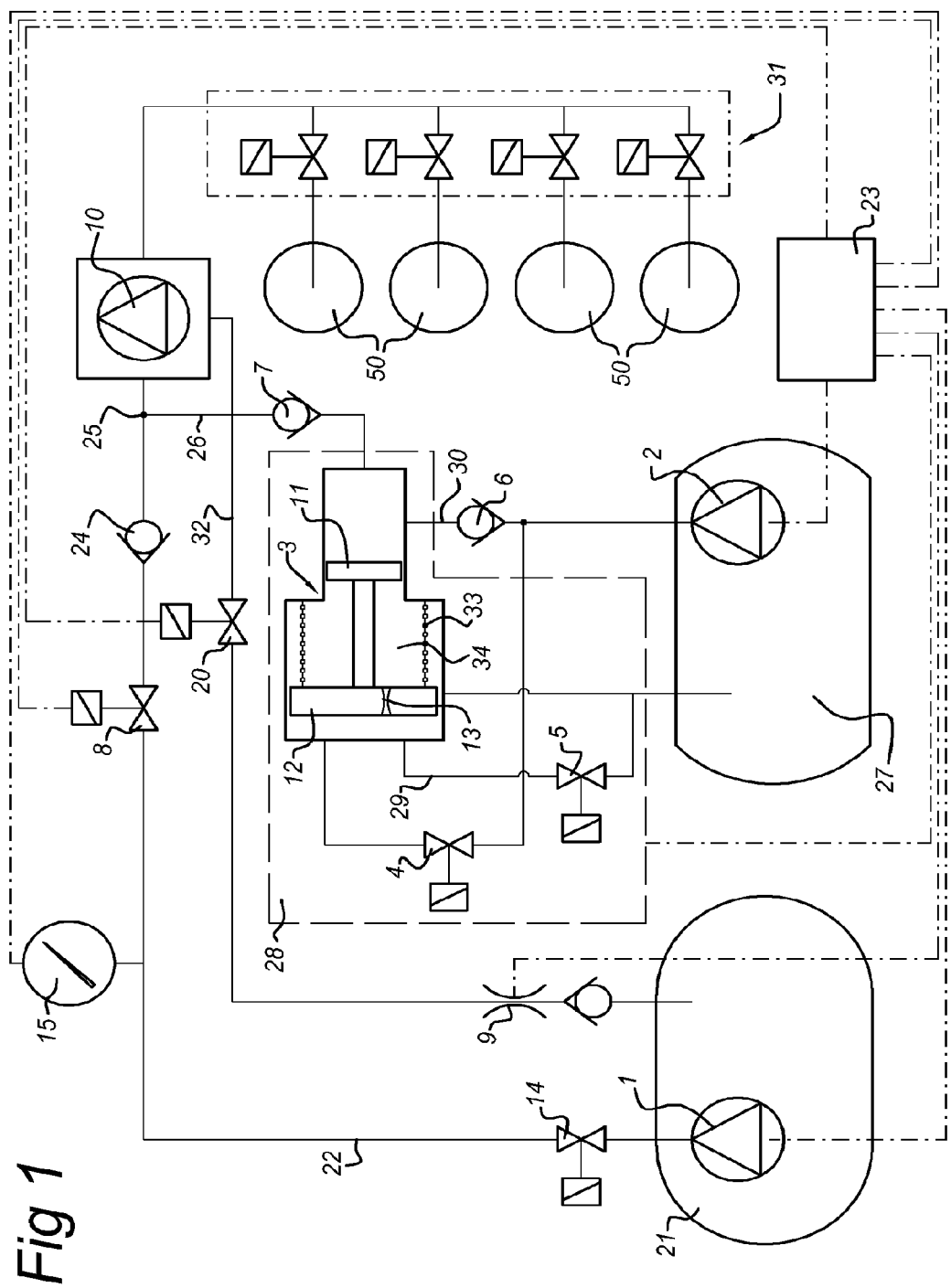
FIG. 1 shows schematically a first embodiment of a system according to the invention.

A first embodiment of a system according to the invention is described in FIG. 1. The system comprises a storage tank 21 for a liquefied vapour such as LPG. It should be understood, however, that any liquefied vapour can be used. Examples include pure propane and butane.

A pump 1 is mounted in the storage tank 21. In this manner fuel is removed by suction from the tank and put under high pressure. The fuel in then pumped into the fuel supply line 22 through a safety shut-off valve 14. The pressure increase in relation to the storage tank lies within the range of between 0.5-10 bar and is more specifically approximately 4-6 bar.

A pressure sensor 15 is connected to the supply line 22. This can be connected to an LPE (not shown). The pressure sensor 15 can also be connected to a control unit 23. The control unit 23 is arranged for controlling the method of switching between two fuels. The control unit 23 may be arranged to perform the usual LPE functions. The control unit 23 can be connected to a controllable switch which can be operated by the driver of the vehicle in which the direct injection combustion engine is mounted, thus enabling the driver to indicate and control switching between the fuels.

A further safety shut-off valve 8 is mounted in fuel line 22. This safety shut-off valve is closed at both ends. A non-return valve 24 is positioned further downstream of the safety shut-off valve 8. This prevents, at all times, that a fuel can reach line 22 via the non-return valve 24.

In one advantageous embodiment, the non-return valve 24 is a valve which can be shut off at both ends. This increases safety as it enables the prevention of leakage of gas from the return line.

Safety valves 14 and 8 are fully open when the system is in operation, i.e. when the arrangement operates in a mode wherein liquefied gas is used as a fuel, and is fully closed when not in operation.

A junction 25 is arranged downstream of the non-return valve, which is connected to a supply line 26 of the other fuel, in this case a petrol fuel storage means 27.

Petrol fuel storage means 27 is fitted with a fuel pump 2. In the embodiment shown, a branch is formed downstream of the fuel pump 2 towards a purge unit 28 according to the invention.

In the embodiment according to FIG. 1, purge unit 28 comprises a control valve 4 connected to an inlet of an intensifier or pressure booster 3. The pressure intensifier 3 comprises a piston 12 with a large cross-section coupled along a plunger with a piston 11 having a smaller cross section. An outlet of the channel in which piston 11 is incorporated is connected to line 26 and to junction 25 via a non-return valve 7. The pistons 11 and 12 are located in the cylinder, wherein piston 11 is located in a constricted portion.

Fuel can fill the pressure booster via the inlet of the pressure booster 3 and via the compensation bore 13. In an initial position, the pistons 12, 11 are in a position near to the left side of the pressure booster. The interstitial space between pistons 12, 11 can be ventilated to fuel storage means 27.

A supply side of the pressure booster is further connected to a return line 29 via a shut-off valve 5. The interstitial space between pistons 12, 11 is connected to the return line.

Further to this, a bypass 30 of the pressure booster 3 is also present. This bypass 30 is the supply line of fuel from the storage means 27 in a normal operation mode.

A high-pressure fuel rail 31 is located in close proximity to the combustion engine (not shown). A high-pressure pump 10 is incorporated in the supply line downstream of fuel line junction 25 and can bring the supplied fuel to a high pressure suitable for direct injection into the combustion engine via high-pressure rail 31. A four cylinder arrangement 50 is shown here. The high-pressure rail 31 comprises four schematically represented injectors for injection into the four cylinders. The invention may apply to any number of cylinders.

A return line for liquefied gas 32 is connected to a high-pressure pump. This return line only acts as a return for the liquefied gas.

In one embodiment, the bi-fuel system according to the invention can be built into an existing combustion engine and the section required for liquefied gas can be added to the existing section. The combustion engine is controlled by an ECU, represented in FIG. 1 as the integrated control unit 23. The ECU is capable of controlling the supply of fuel, in this case fuel from storage means 27, in accordance with measured parameters, as is customary in such combustion engines. The adjustment is such, that the return of the high-pressure pump 10 is not necessary for the fuel 'normally' used.

Depending on the desired mode of operation, as is defined, for example, by exerting pressure on the acceleration pedal in the case of a car engine, a certain quantity of liquid fuel will need to be delivered through high-pressure rail 31. This quantity is determined by control unit 23. Depending on the required quantity, control unit 23 will control the delivery from pump 2.

According to the invention, when the combustion engine is switched to the fuel from storage 21, the ECU, illustrated as the control unit 23, will provide that approximately 20-30% more fuel volume will be injected by the injectors. This increase in volume results in a stable and efficient behaviour of the combustion engine. Such an adaptation is particularly easy to implement in existing systems. The costs are reduced considerably.

The return flow through return line 32 is required, for example, to remove vapour bubbles from the supply line by pumping.

A restriction 9 is incorporated in the return line 32. The effective cross-section of this restriction 9 is variable and controlled by control unit 23. It should be understood that in an alternative embodiment a restriction 9 can be used with a non-variable through-flow cross-sectional surface. The return line 32 flows into tank 21. A return-valve 20 is arranged in the return line 32, which can be controlled by control unit 23. When switching over from liquefied vapour to petrol, this return line is closed off When the combustion engine runs on petrol pump 2 is on, valves 4, 5. 8, 14 and 20 are closed off and pump 1 is switched off. Additionally, non-return valves 6 and 7 become active. The pressure booster 11 is in an idle state, preferably with a stroke to the left, as illustrated in FIG. 1. No fuel flows through the purge unit. The ECU or control unit 23 checks the supply of fuel in the usual manner, using available parameters.

When the combustion engine runs on liquefied gas (LPG), pump 1 will be turned on and pump 2 will be turned off. Valves 4, 5, 6 and 7 arc closed off. The pressure booster 3 becomes inactive, whereas the piston is in the upstroke position. Valves 8, 14, 20 are open.

In the operational petrol-consuming mode of the combustion engine, the driver can switch to gas fuel. To achieve this, a driver of a vehicle in which the system according to the invention is incorporated, can operate a switch. This puts fuel change-over system into operation. The control unit 23 will coordinate the switching operation. First of all, the LPG pump 1 can be actuated. At essentially the same time, valve 14 is opened. The pressure sensor 15 will measure an increase in pressure in the fuel line 22. The ECU controls the supply of liquefied gas. The ECU is adjusted to a 20-30% higher consumption of liquefied gas in relation to petrol. When a sufficient amount of pressure is reached, valve 8 can be opened. The pressure in the LPG supply line 22 is higher than the pressure in the petrol supply line. The liquefied gas will therefore displace the petrol. After a predefined time, which is possibly dependent on the instantaneous consumption of petrol by the engine, pump 2 can be switched off thus completing the switching cycle.

When switching takes place from gas to petrol, the driver will enter the relevant instruction and the control unit will record this and perform a number of steps of the procedure according to the invention. One of the first steps will be the actuation of the petrol pump 2. At essentially the same time, valves 4 and 5 are opened. This results in a flow of petrol through a portion of the purge unit 28. After a certain number of seconds, for example 2-6 seconds, valve 5 and 20 are closed, thus actuating the pressure booster 3. The pistons 11, 12 will make a stroke to the right under the continual build-up of petrol on the left side. In this manner, the petrol will be fed from the exit side of the pressure booster through the line 26 to fuel line junction 25 and this will purge and displace the downstream liquefied gas. After a predefined short period of time, after the booster has commenced with the purging operation, valves 8 and 20 can be closed. This may be approximately 0.1-2.5 seconds later. The LPG pump 1 can be switched off and valve 14 can be closed off The switch-over procedure is now completed. The procedure is preferably applied in order to return the purge unit 28, in particular the intensifier 3, back into its initial starting position. This occurs by controlling the valves 4 and 5 respectively. Valve 4 can be closed while valve 5 is opened. In this manner, the piston 11, 12 is returned to the initial starting position. An additional adjustment spring 33 forces the piston 11, 12 back into the initial starting position.

The purge unit enables a displacement effect to be achieved with a single stroke of a piston 11, 12. As a result, the conversion from existing systems to bi-fuel systems according to the invention can be performed at low costs.

Figure 2:
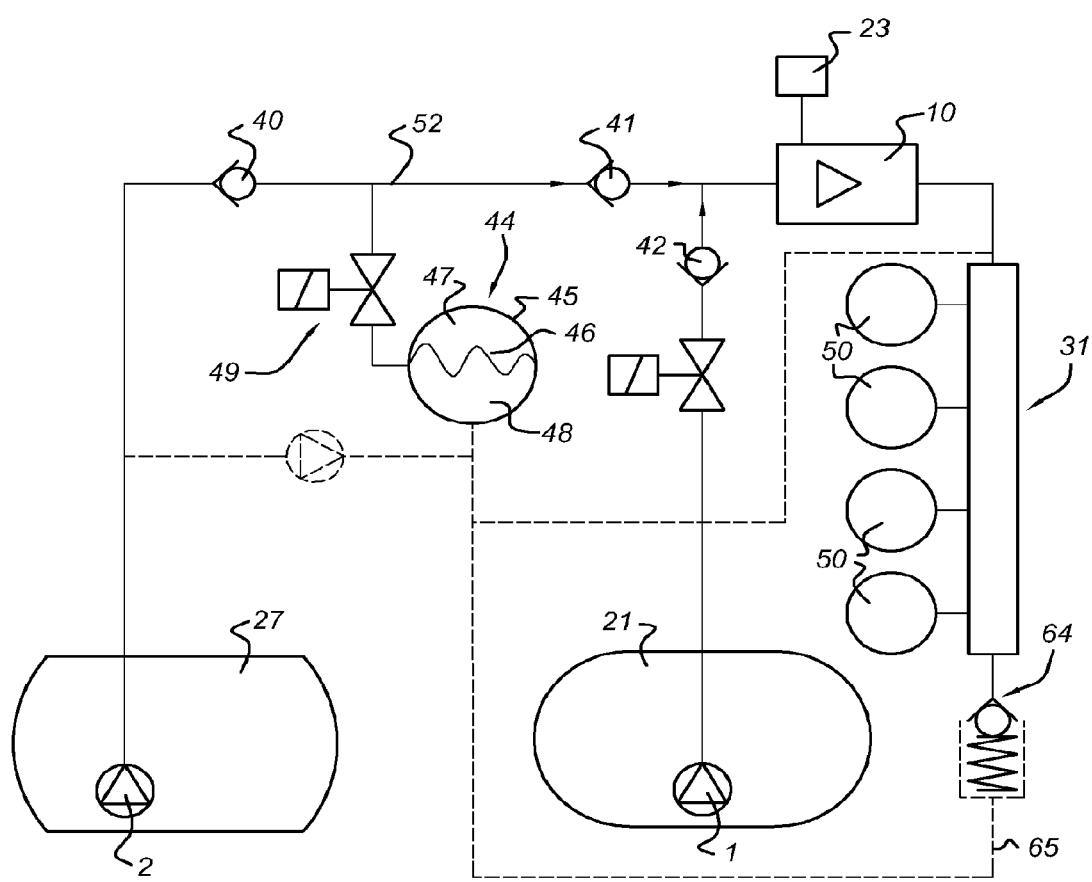
FIG. 2 shows schematically a second embodiment of a system according to the invention.

FIG. 2 shows a second embodiment of a system for feeding two fuels to a combustion chamber, wherein a purge unit is applied in order to simplify switching between the fuels, in particular switching between a liquefied gas such as LPG to petrol, specifically in combination with a direct injection (DI) combustion engine.

The embodiment shown in FIG. 2 comprises a DI combustion engine with four cylinders 50 into which fuel is injected through a high-pressure rail 31, the injectors of which are not shown. The high-pressure rail 31 is connected downstream to the high-pressure discharge of the high-pressure pump 10. The high-pressure pump 10 is connected via individual channels to the respective fuel storages 21 and 27 for liquefied gas, such as LPG, and a petrol fuel. Non-return valves 40, 41, 42 are incorporated in the channels which prevent fuel from flowing back through the supply lines to the storage means 21, 27. The supply lines may comprise a pump 1, 2 for supplying the fuel from the storage means to the channels and, ultimately, to the high-pressure pump 10. FIG. 2 is a simplified representation of a system according to FIG. 1. It should be noted that return lines and control means are incorporated in the embodiment shown, but are not shown in the drawing.

In the embodiment shown in FIG. 2, the purge unit is formed by pressure accumulator 44, represented schematically as a sphere 45 incorporating a membrane 46. The membrane separates a gas side 47, in which a predefined quantity of gas is formed, from a liquid side 48. The liquid side 48 can be emptied via a control valve 49 and is connected to the feed channel 52 for supplying petrol to the high-pressure pump 10.

In order to switch from LPG to petrol, petrol is collected in the pressure accumulator 44 according to a method described in more detail below. When the driver of a car for example, in which the DI combustion engine as shown is incorporated, wishes to switch from LPG to petrol fuel, valve 49 can be opened and the accumulated petrol will finds its way through channel 52 to the high pressure pump 10, in which the vapour present between the non-return valves 41 and 42 is displaced by petrol and switching between the fuel can be performed without problems occurring.

The petrol can be accumulated in the pressure accumulator 44 in a number of ways. This is indicated in FIG. 2 by dotted lines.

A first option may be the supply of petrol from the storage 27 via a schematically represented the pump shown in dotted lines 60. This may be an electric pump, connected to a battery. The capacity of the pump 60 may be small as there is often sufficient time after its use during switching to reload the accumulator, i.e. to fill it with fuel. The petrol is collected at the liquid side 48 and can only be released via valve 49.

Another option, also indicated by dotted lines, can be the connection of a supply line to the liquid side 48 of the pressure accumulator 44 by means of a I-piece mounted onto the high-pressure rail 31. In this manner a branch is formed through which the fuel prevailing under high pressure in the high-pressure rails 31 can be supplied to the liquid side 48. Control valves and shut-off valves known by those skilled in the art can be used to continually reload the pressure accumulator for each subsequent switching cycle. For example, it is possible to arrange a control means to allow supply to the pressure accumulator only when the pressure within the high-pressure rail 31 has reached a minimum pressure of, for example, 60 bar. This ensures that there is a build-up of sufficient pressure in the pressure accumulator to perform the desired purging effect during the switching cycle, thus displacing the liquefied gas.

Yet another option, or possibly an additional option, is the use of a schematically represented overflow valve 64 which is mounted to the high-pressure rail 31. This valve 64 is present in order to protect the high-pressure rail 31 from overloading. The valve 64 will open when a certain threshold pressure is reached. It is possible for the overflow valve to be connected to the accumulator. The connection 65 may include suitable controllable shut-off valves and valves.

In this last embodiment an LPG control unit 23 can be arranged in order to generate a temporary condition of high-pressure using the high-pressure pump 10 in the high-pressure rail 31. This will result in the overflow valve 64 being opened so that petrol can reach the accumulator and be stored there until the switching cycle is set. This temporary increase in pressure can be of short duration. The volume of petrol required for purging is sufficiently small.

Figure 3:
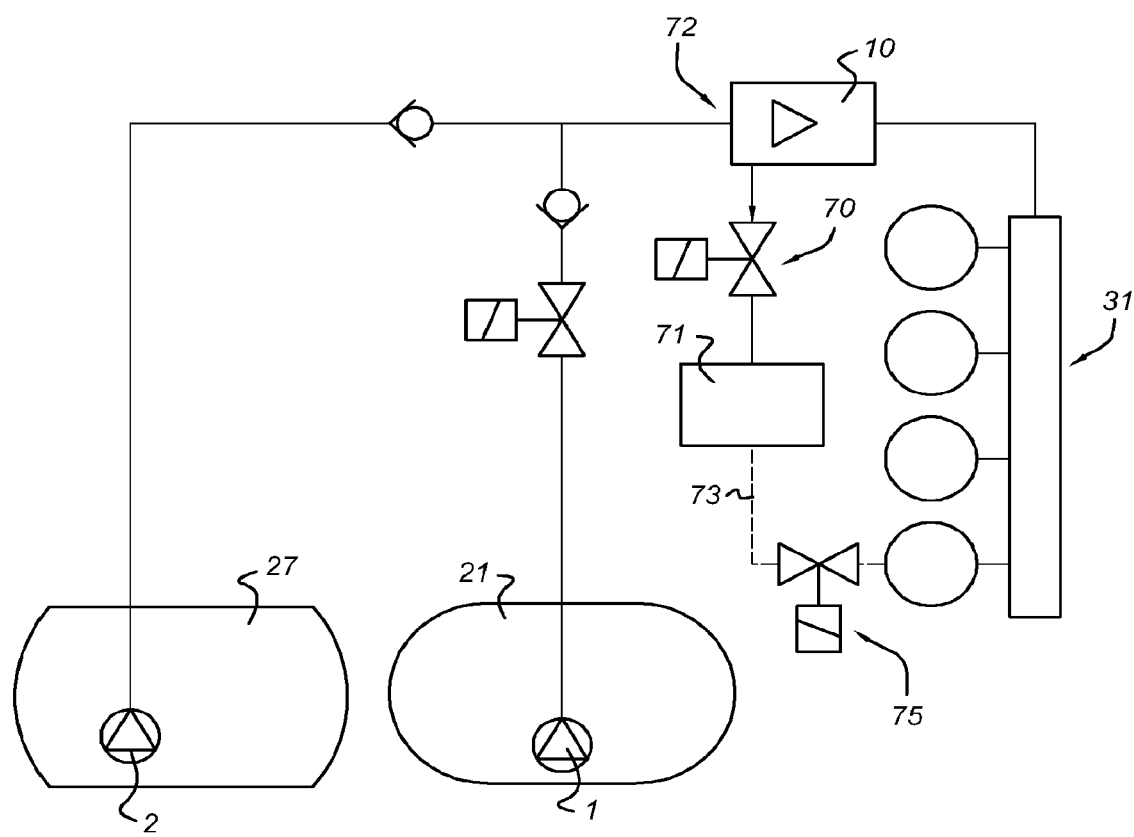
FIG. 3 shows schematically a third embodiment of a system according to the invention.

FIG. 3 shows yet another embodiment of an arrangement which is suitable for the use of and the switch-over between two fuels in which switching from LPG to petrol as a fuel is particularly improved.

It should be noted that return lines, as well as the control unit, are present in the embodiment shown, but not shown in the drawing.

Two fuel storages 21, 27 are connected to the high-pressure pump 10 of a DI-combustion engine. Those skilled in the art are capable of constructing suitable channels.

In this embodiment, a blow-off valve 70 of the high-pressure pump 10 is coupled with a carbon canister 71. The blow-off valve 70 is represented schematically to the exterior of the high-pressure pump 10. The pressure/fuel can be quickly released through the blow-off valve 70 from the suction side 72 of the high-pressure pump 10. This functionality can be applied when switching over to petrol fuel. By venting the liquefied gas, petrol can be fed via the petrol pump 2 to the suction side of the high-pressure pump after which switching can take place. A control unit (not shown) suitable for that purpose can be connected to pump 2 and valve 70 in order to perform this switch-over, thus enabling the switching operation to be correctly timed. The blow-off of the LPG present in the line can be performed until the pressure on the suction side 72 is lower than the pressure required to return fuel with pump 2.

A carbon canister 71 can be connected to the valve 70 in order to prevent LPG being released into the environment. A channel 73 can be mounted from canister 71 which feeds LPG back into the engine through a schematically represented control valve 75 suitable for that purpose. The carbon canister can then be revitalized.

The purge unit according to this embodiment comprises a purging action wherein the prevailing vapour is evacuated and then displaced by petrol. Preferably, the inlet portion or supply side of the high-pressure pump is purged.

Figure 4:
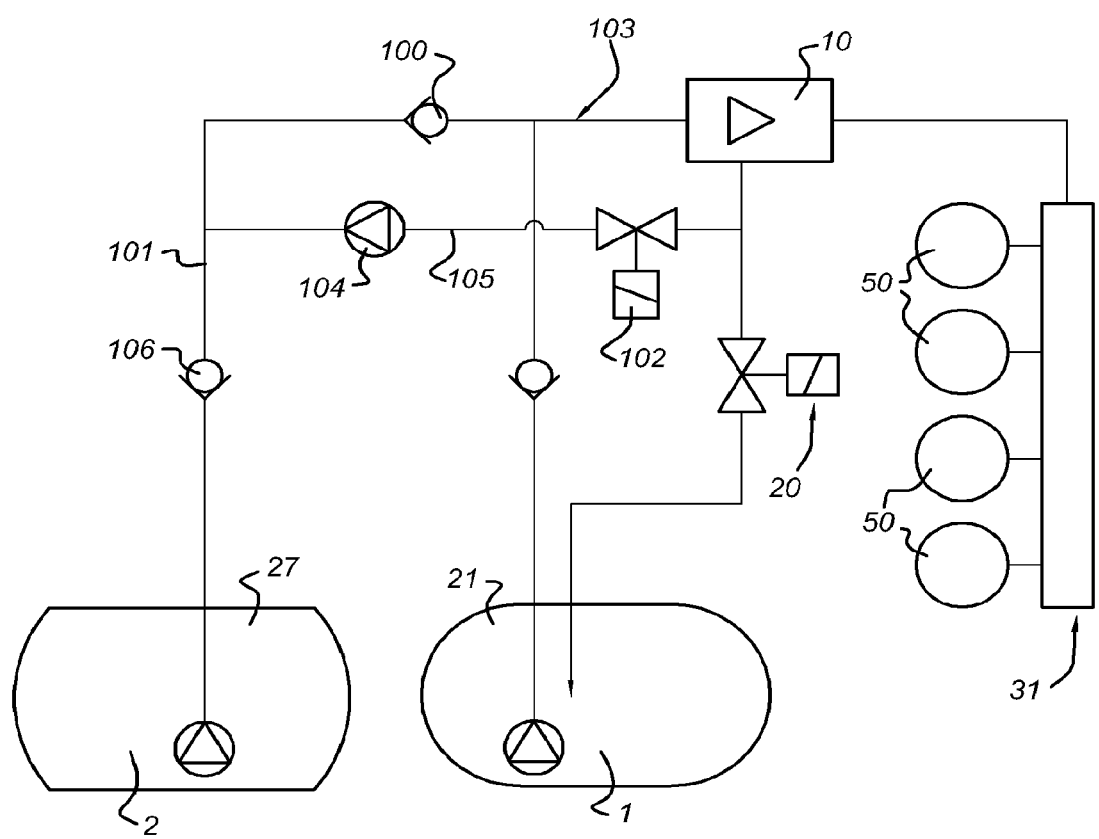
FIG. 4 shows schematically a fourth embodiment of a system according to the invention.

FIG. 4 is a schematic representation of another embodiment. To achieve this, a bypass in the form of a control valve 102 is mounted across a non-return valve 100 in a petrol supply line 101, which is arranged so as to prevent the return of a fuel to the petrol storage tank 27. During the switching procedure or just before switching commences, the pressure of the LPG at the suction side 103 of the high-pressure pump 10 is higher than the pressure that can be generated by the petrol pump 2.

When switching is performed, valve 20 is closed and valve 102 is opened. Opening the valve 102 whilst switching the fuels allows the LPG present at the suction side 103 to expand somewhat throughout, for example, a preferably large portion of the petrol supply line 101. The LPG will mix with the supplied fuel. Surprisingly, the inventor has discovered that the mixture of LPG with petrol in the petrol supply line has a vapour pressure that is manageable within the petrol fuel system, thus enabling the mixture to be supplied to the high-pressure pump 10. The opening operation of the valve 102 can be positively timed, preferably just before petrol begins to accumulate in front of non-return valve 100.

In the bypass line 105 (which bypasses non-return valve 100), which is accessible to gas after switching has commenced and valve 102 has been opened, the vapour will disperse over a much greater portion of the fuel supply lines. The bypass line 105 may additionally comprise a pump 104 for the purpose of supporting circulation. The bypass 105 connects a point specifically upstream of valve 20 to a junction in the supply system specifically downstream of a non-return valve 106. The circulation 104 is arranged in order to cause an artificial circuit of fuel, in which the LPG present under high pressure mixes with the newly supplied fuel just before switching over to the new fuel. This mixing under the effects of the high-pressure pump 104 prevents the formation of LPG pockets which could otherwise have an adverse effect on the smooth running of the engine.

FIG. 4 relates specifically to another aspect. It should be noted that return lines, as well as the control unit are present in the embodiment shown, but not shown in the drawing.

FIG. 4 relates in particular to an invention wherein an arrangement for a combustion engine with direct injection is provided, the arrangement comprising at least one high pressure pump connected to the internal combustion engine for the direct injection of fuel, wherein said arrangement comprises at least two fuel storages for a first fuel and a second fuel, for example liquefied gas and petrol respectively, as well as two lines running from the storages to an inlet of the high-pressure pump for supplying the fuels to said pump, said lines being provided with non-return valves, wherein a control valve is mounted across a non-return valve in the petrol fuel line. This controllable valve is arranged so that it enables the expansion of liquefied gas present at the suction side of the high-pressure pump in the petrol fuel line.

The controllable valve is connected to a control unit. The control unit comprises an operable switch for the change-over of the fuel supply. The control unit is arranged to open the control valve when switching from LPG to petrol.

What is claimed is:

1. Arrangement for a combustion engine with direct injection, comprising:
    a high pressure pump connectable to the internal combustion engine via a high-pressure rail, wherein the high pressure pump is configured to pump fuel into the high-pressure rail for the direct injection of fuel, the internal combustion engine;
    at least two fuel storages for LPG and petrol, respectively;

a LPG line running from the LPG storage to an inlet of the high-pressure pump;
a petrol fuel line running from the petrol storage to the inlet of the high-pressure pump, the LPG line being separate from the petrol fuel line, said high-pressure pump arranged for switching between directly injecting the LPG and the petrol into the high-pressure rail of the internal combustion engine;
a LPG pump received in the first fuel storage and operative to pump the LPG, via the LPG line, to the inlet of the high-pressure pump;
a petrol fuel pump operative to pump the petrol, via the petrol fuel line, to the inlet of the high-pressure pump;
a first non-return valve provided in the LPG line;
a second non-return valve provided in the petrol fuel line; and
a control valve upstream from the high pressure pump mounted across the second non-return valve provided in the petrol fuel line, wherein the control valve is configured to allow the LPG to enter at least part of the petrol fuel line during switching.

2. Arrangement for the supply of fuel to a combustion engine with direct injection, comprising:
at least one high pressure pump connectable via a high-pressure rail, wherein the high pressure pump is configured to pump fuel into the high-pressure rail for the direct injection of fuel into the internal combustion engine;
at least two fuel storages for a first LPG fuel storage and a second liquid petrol fuel storage;
a first fuel line running from the first LPG fuel storage to an inlet of the high-pressure pump;
a second fuel line running from the second liquid petrol fuel storage to the inlet of the high-pressure pump, the first LPG fuel line being separate from the second petrol fuel line, said high-pressure pump arranged for switching between directly injecting the first LPG fuel and the second liquid petrol fuel into the high-pressure rail of the internal combustion engine, the LPG and second petrol fuel lines connected to a common fuel line feeding the inlet of the high-pressure pump;
a first fuel pump received in the first LPG storage and operative to pump the LPG- via the first LPG line, to the inlet of the high-pressure pump;
a second fuel pump operative to pump the second petrol liquid fuel, via the second petrol fuel line, to the inlet of the high-pressure pump;
a first non-return valve provided in the first LPG line;
a second non-return valve provided in the second petrol fuel line;
a purge unit for purging , into the common fuel line, the second fuel to said high-pressure pump during switching, the purge unit connected upstream of the inlet of the high-pressure pump; and
wherein the LPG and petrol fuel lines are arranged such that during switching, when the petrol fuel line is in a feeding petrol state, the LPG fuel expands at least partially into the petrol fuel line.

3. The arrangement of claim 1, wherein the petrol fuel line has a further non-return valve upstream from the second non-return valve.

4. The arrangement of claim 1, wherein the LPG and petrol fuel lines are arranged such that during switching the LPG fuel expands at least partially into the second petrol fuel line.

5. The arrangement of claim 1, wherein the LPG and petrol fuel lines are arranged such that during switching, when the petrol fuel line is feeding petrol is open, the LPG fuel expands at least partially into the petrol fuel line.

6. A method for the alternate direct injection of two types of fuel into an internal combustion engine, comprising:
pumping fuel with a high pressure pump connected to the internal combustion engine via a high-pressure rail, wherein the high pressure pump is configured to pump fuel into the high-pressure rail for the direct injection of fuel into the internal combustion engine;
storing a first fuel and a second fuel, LPG and petrol respectively, with at least two fuel storages;
wherein a first fuel line runs from the first fuel storage to an inlet of the high-pressure pump, and wherein a first non-return valve is provided in the first fuel line;
wherein a petrol fuel line runs from the second fuel storage to the inlet of the high-pressure pump, and wherein a second non-return valve is provided in the petrol fuel line, the first fuel line being separate from the petrol fuel line,
switching said high-pressure pump between directly injecting the first fuel and the second fuel into the high-pressure rail of the internal combustion engine;
pumping the first fuel with a first fuel pump, via the first fuel line, to the inlet of the high-pressure pump;
pumping the second fuel with a second fuel pump, via the petrol fuel line, to the inlet of the high-pressure pump;
controlling opening of a control valve, mounted across the second non-return valve provided in the petrol fuel line during switching from supplying the first fuel to supplying the second fuel, whereby the opening of the control valve allows mixing of the first fuel (LPG) with the second fuel (petrol) present in the petrol fuel line to reduce the vapour pressure at the inlet of the high-pressure pump.

7. The method of claim 6, wherein during switching, when the control valve is opened, LPG enters at least partially into the petrol fuel line.

8. The method of claim 6, wherein the first fuel pump is received in the first fuel storage and the second fuel pump is received in the second fuel storage.

9. Method for the alternate direct injection of two types of fuel, comprising:
providing a first LPG fuel storage and a second liquid petrol fuel storage,
providing a LPG fuel pump received in the first LPG fuel storage and operative to pump the first LPG fuel, via a first LPG fuel line, to the inlet of a high-pressure pump;
providing a second petrol fuel pump operative to pump the second liquid petrol fuel, via a second petrol fuel line, to the inlet of the high-pressure pump;
switching between the fuels by alternately supplying the fuels to said high-pressure pump so as to alternate providing LPG fuel and petrol fuel to said high-pressure pump for direct injection of the LPG fuel and the petrol fuel by said high-pressure pump into the internal combustion engine,
increasing the pressure of the supplied fuel with said high-pressure pump to allow direct injection of the supplied fuel into the internal combustion engine, and
subsequently injecting the fuel into a combustion engine,
wherein switching from the LPG fuel to the liquid petrol fuel comprises purging the liquid petrol fuel supplied to the high-pressure pump,
wherein said purging action, during said switching from the LPG fuel to the liquid petrol fuel, comprises equalizing the pressure of the supplied fuels at a location upstream of an inlet of the high-pressure pump, and wherein during switching from the LPG fuel to the liquid fuel, when the second liquid fuel line is in a petrol feeding state, LPG enters at least partially into the petrol fuel line.

* * * * *

UNITED STATES PATENT AND TRADEMARK OFFICE
CERTIFICATE OF CORRECTION

| | |
|---|---|
| PATENT NO. | : 9,494,074 B2 |
| APPLICATION NO. | : 14/226163 |
| DATED | : November 15, 2016 |
| INVENTOR(S) | : Maria Servatius Alfons Jaasma et al. |

It is certified that error appears in the above-identified patent and that said Letters Patent is hereby corrected as shown below:

On the Title Page

Page 1 (item (72), Inventors) at Line 3, Change "Westerhove, NL" for Van Eijck; Piet to --Westerhoven, NL--.

In Column 2 (page 2, item (56)) at Line 29, Under Other Publications, change "Robert E E." to --Robert E.--.

In the Specification

In Column 1 at Line 66, Change "comlected" to --connected--.

In Column 7 at Line 18, After "off" insert --.--.

In Column 7 at Line 67, After "off" insert --.--.

In Column 8 at Lines 34-36, Delete "1. It should be noted that return lines and control means are incorporated in the embodiment shown, but are not shown in the drawing." and insert the same on Column 8, Line 33 as a continuation of the same paragraph.

In the Claims

In Column 11 at Line 51, In Claim 2, change "purging ," to --purging,--.

Signed and Sealed this
Twenty-eighth Day of March, 2017

Michelle K. Lee
*Director of the United States Patent and Trademark Office*